United States Patent
Yang et al.

(10) Patent No.: US 10,035,133 B2
(45) Date of Patent: Jul. 31, 2018

(54) CATALYSTS WITH ATOMICALLY DISPERSED PLATINUM GROUP METAL COMPLEXES AND A BARRIER DISPOSED BETWEEN THE COMPLEXES

(71) Applicant: GM GLOBAL TECHNOLOGY OPERATIONS LLC, Detroit, MI (US)

(72) Inventors: Ming Yang, Troy, MI (US); Xingcheng Xiao, Troy, MI (US); Ryan J. Day, Waterford, MI (US); Gongshin Qi, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/334,164

(22) Filed: Oct. 25, 2016

(65) Prior Publication Data

US 2018/0111111 A1 Apr. 26, 2018

(51) Int. Cl.
*B01J 21/04* (2006.01)
*B01J 21/06* (2006.01)
(Continued)

(52) U.S. Cl.
CPC .......... *B01J 23/58* (2013.01); *B01J 37/0201* (2013.01); *B01J 37/024* (2013.01); *B01J 37/0236* (2013.01); *B01J 37/08* (2013.01)

(58) Field of Classification Search
CPC . B01J 21/04; B01J 21/06; B01J 21/063; B01J 21/066; B01J 21/08; B01J 21/12;
(Continued)

(56) References Cited

U.S. PATENT DOCUMENTS 4,279,779 A * 7/1981 Sanchez .................. B01J 21/04
423/628
4,390,456 A * 6/1983 Sanchez .................. B01J 21/04
423/628
(Continued)

FOREIGN PATENT DOCUMENTS

CN 103974759 8/2014
EP 0695580 3/2003
(Continued)

OTHER PUBLICATIONS

Ming Yang et al.; U.S. Appl. No. 15/334,109, filed Oct. 25, 2016 entitled "Catalysts With Atomically Dispersed Platinum Group Metal Complexes"; 34 pages.
(Continued)

*Primary Examiner* — Cam N. Nguyen
(74) *Attorney, Agent, or Firm* — Harness, Dickey & Pierce, P.L.C.

(57) ABSTRACT

A catalytic converter includes a catalyst. The catalyst includes a metal oxide support and platinum group metal (PGM) complexes atomically dispersed on the metal oxide support. The PGM complexes include a PGM species selected from the group consisting of an atom of a platinum group metal, a cluster including from 2 atoms to less than 10 atoms of the platinum group metal, a nanoparticle including 10 or more atoms of the platinum group metal, and combinations thereof. An alkali metal or an alkaline earth metal is bonded to the PGM species. The alkali or alkaline earth metal is part of a structure including oxygen atoms and hydrogen atoms. A barrier is disposed between a first PGM complex and a second PGM complex.

20 Claims, 7 Drawing Sheets

US 10,035,133 B2
Page 2

(51) Int. Cl.

| | | |
|---|---|---|
| *B01J 21/08* | (2006.01) | |
| *B01J 21/12* | (2006.01) | |
| *B01J 23/02* | (2006.01) | |
| *B01J 23/04* | (2006.01) | |
| *B01J 23/06* | (2006.01) | |
| *B01J 23/10* | (2006.01) | |
| *B01J 23/40* | (2006.01) | |
| *B01J 23/42* | (2006.01) | |
| *B01J 23/44* | (2006.01) | |
| *B01J 23/46* | (2006.01) | |
| *B01J 23/58* | (2006.01) | |
| *B01J 37/02* | (2006.01) | |
| *B01J 37/08* | (2006.01) | |

(58) Field of Classification Search
CPC ... B01J 23/02; B01J 23/04; B01J 23/06; B01J 23/10; B01J 23/40; B01J 23/42; B01J 23/44; B01J 23/46; B01J 23/58; B01J 37/0201; B01J 37/0236; B01J 37/024; B01J 37/08
See application file for complete search history.

(56) References Cited

U.S. PATENT DOCUMENTS

| | | | | |
|---|---|---|---|---|
| 5,494,701 A * | 2/1996 | Clough | ............... | C03C 25/1095 427/126.3 |
| 5,603,983 A * | 2/1997 | Clough | ............ | C04B 35/62847 427/126.3 |
| 5,633,081 A * | 5/1997 | Clough | ............... | C03C 17/27 428/331 |
| 5,756,207 A * | 5/1998 | Clough | ............ | C04B 35/62847 428/375 |
| 6,022,825 A | 2/2000 | Anderson et al. | | |
| 7,323,432 B2 | 1/2008 | Niihara et al. | | |
| 7,659,224 B2 | 2/2010 | Shimazaki et al. | | |
| 8,105,561 B2 * | 1/2012 | Hatanaka | ............. | B01D 53/945 422/111 |
| 8,149,854 B2 * | 4/2012 | Lau | ............... | G06F 13/385 370/412 |
| 8,211,392 B2 | 7/2012 | Grubert et al. | | |
| 8,283,281 B2 * | 10/2012 | Ohmura | ............... | B01D 53/945 502/258 |
| 8,309,489 B2 * | 11/2012 | Roldan Cuenya | ..... | B01D 53/88 502/182 |
| 8,349,761 B2 | 1/2013 | Xia et al. | | |
| 8,513,158 B2 * | 8/2013 | Roldan Cuenya | ..... | B01D 53/88 502/240 |
| 8,535,632 B2 * | 9/2013 | Chase | ................ | B01D 53/8678 422/139 |
| 8,679,433 B2 * | 3/2014 | Yin | ............ | B01D 53/944 423/213.2 |
| 8,852,689 B2 * | 10/2014 | Srinivas | ................. | A01N 25/34 427/191 |
| 8,969,237 B2 * | 3/2015 | Yin | ............ | B01D 53/944 427/446 |
| 8,992,869 B2 | 3/2015 | Ratts et al. | | |
| 9,034,286 B2 | 5/2015 | Bergeal et al. | | |
| 9,126,191 B2 * | 9/2015 | Yin | ............ | B01J 23/42 |
| 9,156,025 B2 * | 10/2015 | Qi | ............ | B01J 37/0228 |
| 9,427,732 B2 * | 8/2016 | Yin | ............ | B01J 35/0006 |
| 9,498,751 B2 * | 11/2016 | Yin | ............ | B01D 53/944 |
| 9,511,352 B2 * | 12/2016 | Qi | ............ | B01J 21/04 |
| 9,517,448 B2 * | 12/2016 | Kearl | ............ | B01D 53/9422 |
| 9,533,289 B2 * | 1/2017 | Yin | ............ | B01J 23/42 |
| 9,566,568 B2 * | 2/2017 | Yin | ............ | B01J 35/0006 |
| 9,649,627 B1 | 5/2017 | Xiao et al. | | |
| 9,687,811 B2 * | 6/2017 | Biberger | ............ | F01N 3/0842 |
| 2002/0082163 A1 | 6/2002 | Yan et al. | | |
| 2005/0233896 A1 * | 10/2005 | Carter | ............ | B01J 23/40 502/302 |
| 2007/0060473 A1 * | 3/2007 | Saito | ............ | B01D 53/9422 502/302 |
| 2009/0041645 A1 | 2/2009 | Wassermann et al. | | |
| 2010/0086832 A1 | 4/2010 | Lopez et al. | | |
| 2010/0204518 A1 | 8/2010 | Wolf et al. | | |
| 2011/0223096 A1 | 9/2011 | Wolf et al. | | |
| 2013/0034472 A1 | 2/2013 | Cantrell et al. | | |
| 2014/0041905 A1 * | 2/2014 | Srinivas | ............ | A01N 25/34 174/251 |
| 2014/0057781 A1 | 2/2014 | Stamm Masias et al. | | |
| 2014/0256534 A1 * | 9/2014 | Gao | ............ | B01D 53/944 502/5 |
| 2015/0231566 A1 | 8/2015 | Xu et al. | | |
| 2015/0266014 A1 | 9/2015 | Xue et al. | | |
| 2015/0368817 A1 * | 12/2015 | Xu | ............ | C25L 39/10 204/252 |
| 2016/0149230 A1 * | 5/2016 | Debe | ............ | B01J 23/42 502/4 |
| 2017/0095795 A1 | 4/2017 | Xiao et al. | | |
| 2017/0095796 A1 | 4/2017 | Qi et al. | | |
| 2017/0095806 A1 | 4/2017 | Qi et al. | | |
| 2017/0095807 A1 * | 4/2017 | Xiao | ............ | B01D 53/944 |
| 2017/0114458 A1 | 4/2017 | Xiao et al. | | |

FOREIGN PATENT DOCUMENTS

| | | |
|---|---|---|
| GB | 2522978 | 8/2015 |
| JP | 2006192357 | 7/2006 |
| JP | 2009247968 | 10/2009 |
| JP | 2011230104 | 11/2011 |
| JP | 05747952 | 7/2015 |
| JP | 05806536 | 11/2015 |
| KR | 2011001004 | 1/2011 |
| KR | 1092606 | 12/2011 |
| WO | WO2007063615 | 6/2007 |
| WO | WO2013182302 | 12/2013 |

OTHER PUBLICATIONS

Xingcheng Xiao et al.; U.S. Appl. No. 15/253,039, filed Aug. 31, 2016 entitled "Catalytic Converters With Age-Suppressing Catalysts"; 28 pages.
Chen, et al; "Development of low temperature three-way catalysts for future fuel effecient vehicles"; Johnson Matthey Technol. Rev.; 2015; vol. 59; (1); pp. 64-67.
Chang, et al.; "Gasoline cold start concept (gCSC) technology for low temperature emission control"; SAE Int. J. Fuels Labr. 7(2); 2014 pp. 480-488.
Dai, et al.; "A sinter-resistant Catalytic system based on platinum nanoparticles supported on TiO2 nanofibers and covered by porous silica"; Angew. Chem.lnt. Ed.; 2010; vol. 49 pp. 8165-8168.
Lu, et al.; "Coking- and sintering-resistant palladium catalysts achieved through atomic layer deposition" Science; 2012; vol. 335; No. 6073; pp. 1205-1208 Abstract Only.
Pan, et al. "Effect of alumina on structure and acidity of solid acid catalyst Pt—SO_4~(2-)/ZrO_2-Al_2O_3"; Chinese Journal of Catalysis; 2005; Abstract Only.
Wang; "Fabrication and testing of low-temperature catalytically active washcoat materials for next-generation vehicle catalytic converters"; YSU-CTME; 2013; pp. 1-9.
Li, et al.; "A sintering-resistant Pd/Si02 catalyst by reverse-loading nano iron oxide for aerobic oxidation of benzyl alcohol"; RSC Advances; 2015; vol. 5; pp. 4766-4769; Abstract Only.
Lu, et al.; A sinter-resistant catalytic system fabricated by maneuvering the selectivity of Si02 deposition onto the Tio2 surface versus the pt nanoparticle surface Nano Lett.; 2013; vol. 13 (10); pp. 4957-4962; Abstract Only.

* cited by examiner

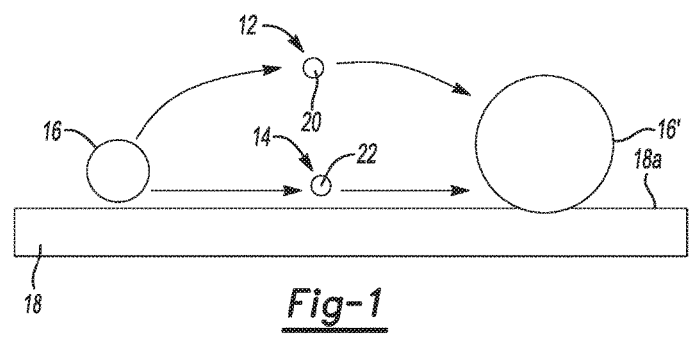
*Fig-1*
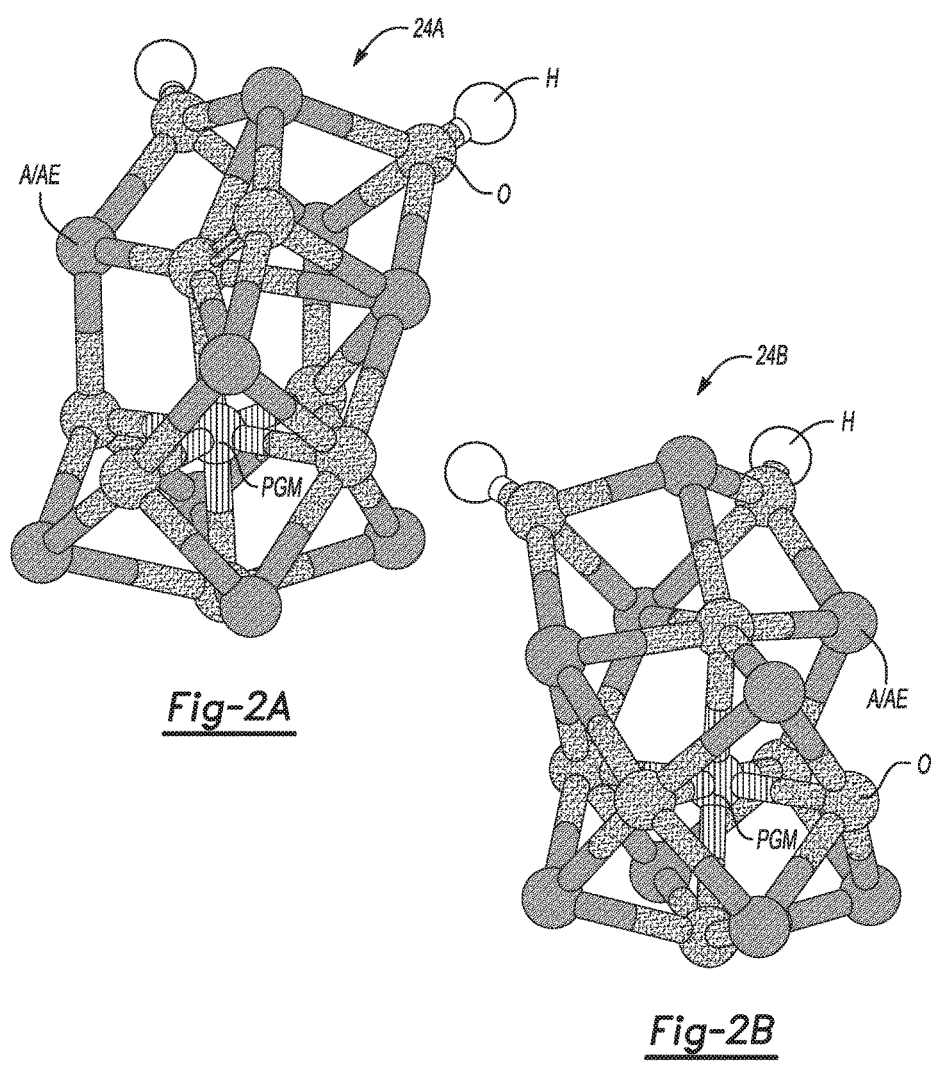
*Fig-2A*
*Fig-2B*

CATALYSTS WITH ATOMICALLY DISPERSED PLATINUM GROUP METAL COMPLEXES AND A BARRIER DISPOSED BETWEEN THE COMPLEXES

INTRODUCTION

Vehicles with an Internal Combustion Engine (ICE) include an exhaust gas treatment system for treating the exhaust gas from the engine. The configuration of the treatment system depends, in part, upon whether the engine is a diesel engine (which typically operates with lean burn combustion and contains high concentrations of oxygen in the exhaust gases at all operating conditions) or a stoichiometric spark-ignited engine (which operates at a nearly stoichiometric air-to-fuel (A/F) ratio). The treatment system for the diesel engine includes a diesel oxidation catalyst (DOC), which is capable of oxidizing carbon monoxide (CO) and hydrocarbons (HC). The treatment system for the stoichiometric spark-ignited engine includes a three-way catalyst (TWC), which operates on the principle of non-selective catalytic reduction of $NO_x$ by CO and HC.

SUMMARY

A catalytic converter includes a catalyst. The catalyst includes a metal oxide support and platinum group metal (PGM) complexes atomically dispersed on the metal oxide support. The PGM complexes include a PGM species selected from the group consisting of an atom of a platinum group metal, a cluster including from 2 atoms to less than 10 atoms of the platinum group metal, a nanoparticle including 10 or more atoms of the platinum group metal, and combinations thereof. An alkali metal or an alkaline earth metal is bonded to the PGM species. The alkali or alkaline earth metal is part of a structure including oxygen atoms and hydrogen atoms. A barrier is disposed between a first PGM complex and a second PGM complex.

In an example of a method for forming a catalyst, atomically dispersed platinum group metal (PGM) complexes are formed on a metal oxide support, and a barrier is selectively formed on the metal oxide support around the PGM complexes.

BRIEF DESCRIPTION OF THE DRAWINGS

Features of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

FIG. 1 is a schematic illustration depicting two mechanisms for PGM particle growth or sintering;

FIGS. 2A-2D depict different examples of the PGM complexes disclosed herein;

DETAILED DESCRIPTION

Figure 2C:
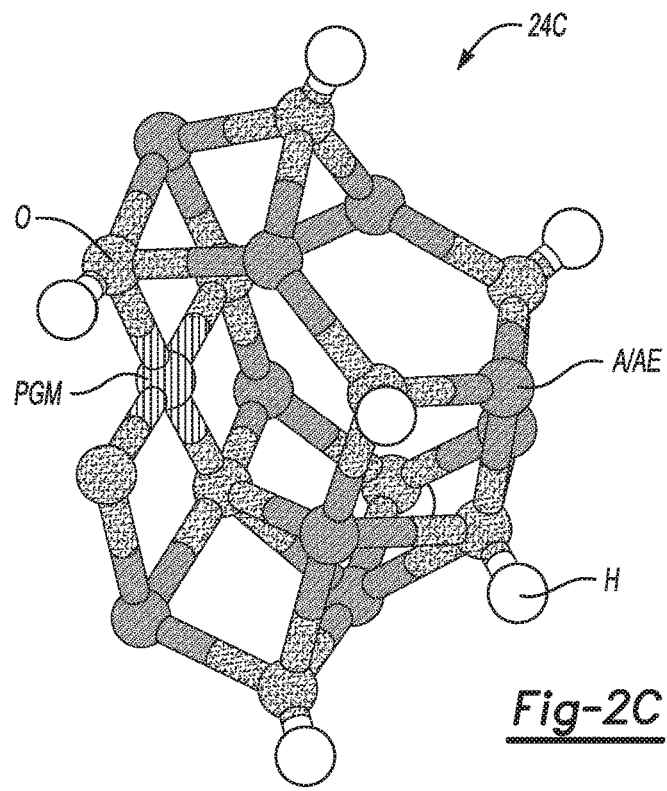
Figure 2D:
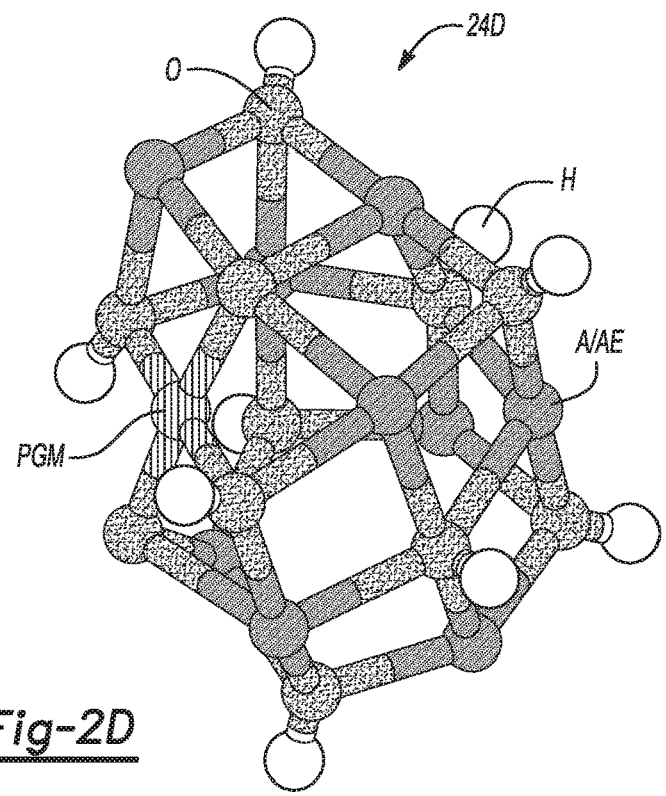

DOCs and TWCs often include a support loaded with a Platinum Group Metal (PGM) as the active catalytic/catalyst material. As the exhaust gas temperature from the vehicle engine increases (e.g., to temperatures ranging from 150° C. to about 1000° C.), the PGM loaded on the support may become unstable and experience growth (i.e., sintering). FIG. 1 depicts two mechanisms for PGM growth during vehicle operation. The mechanisms involve atomic and/or crystallite PGM migration. The first mechanism involves PGM migration via a vapor phase, denoted 12, and the second mechanism involves PGM migration via surface diffusion, denoted 14. In the first mechanism, a mobile species (not shown), emitted from the PGM species 16 loaded on the support 18, can travel through the vapor phase 12 and agglomerate with other metal particles 20 in the vapor phase 12 to form larger PGM particles 16' (e.g., nanoparticles, which have at least ten and, in some instances, up to thousands of atoms). In the second mechanism, a mobile species (not shown) emitted from the PGM species 16 can diffuse along the surface 18a of the support 18 and agglomerate with other metal particles 22 on the surface 18a to form larger PGM particles 16'. The second mechanism may involve Ostwald ripening, where the migration of the mobile species is driven by differences in free energy and local atom concentrations on the support surface 18a.

An increase in the size of the PGM particles 16' results in poor PGM utilization and undesirable aging of the catalyst material. More specifically, the increased particle size reduces the PGM dispersion, which is a ratio of the number of surface PGM atoms in the catalyst to the total number of PGM atoms in the catalyst. PGM particles 16' have many PGM atoms buried inside, which contribute little or nothing to the catalytic reaction. For example, in some PGM particles 16', greater than 80% of the atoms may be spectator catalytic species, or species that are not active catalytic reaction sites. A reduced PGM dispersion is directly related to a decrease in the active metal surface area (as a result of particle growth), and thus indicates a loss in active catalyst reaction sites, which equates to a decrease in catalyst activity. The loss in active catalyst reaction sites leads to poor PGM utilization efficiency, and indicates that the catalyst has undesirably been aged or deactivated.

In the examples disclosed herein, PGM complexes are formed which stabilize single PGM atoms and/or PGM clusters (including from 2 atoms to 10 atoms) and/or PGM nanoparticles (including from at least 10 atoms to 5,000 atoms) with structures that contain alkali metal atoms or alkaline earth metal atoms, oxygen atoms, and hydrogen atoms. The stabilizing structure bonds directly to the PGM atom, or to an atom of the cluster, or to an atom on the basal plane of a nanoparticle, and thus prevents the bound species from vapor or surface migration. Stabilization of the smaller PGM unit (i.e., the single atom or a small cluster of atoms)

may maximize the PGM efficiency, because the less-coordinated atoms are extremely active for CO and HC oxidation and $NO_x$ abatement.

Moreover, the catalysts disclosed herein suppress aging by physically separating the PGM complexes with a metal oxide barrier formed on the support around the PGM complexes or as a porous coating that covers the PGM complexes. By physically separating the PGM complexes, the metal oxide barrier aim to block surface diffusion.

Pores and cracks may be present in and around some examples of the barrier(s). The pores and cracks expose surfaces of the barrier which can capture PGM vapors (e.g., by the condensation of PGM vapor on the exposed surfaces). The mobile species in the captured vapors agglomerate to form new PGM species within pores and cracks. The newly formed PGM species may be smaller than the PGM clusters or nanoparticles, and may provide additional active PGM sites for catalysis.

The PGM complexes and barriers disclosed herein slow down or prevent the PGM particle growth/sintering and maintain more active PGM sites over time, and thus the catalyst ages slower than catalysts without the stabilizing structure of the PGM complexes and without the barrier. Moreover, when sintering is reduced or prevented, the operational temperature of the catalyst is prevented from drifting upward over time.

The PGM complexes 24 disclosed herein include a PGM atom (from about 0.2 nm to about 0.3 nm in diameter) or a PGM cluster (having a diameter less than 1 nm) or a PGM nanoparticle (having a diameter greater than or equal to 1 nm) and the stabilizing structure bound to the PGM atom or one atom of the PGM cluster or a basal plane atom of the PGM nanoparticle. The stabilizing structure consists of alkali metal atoms or alkaline earth metal atoms, oxygen atoms, and hydrogen atoms. Some examples of the PGM complexes 24 are shown in FIGS. 2A through 2D, and are respectively labeled A, B, C, and D. In each of FIGS. 2A through 2D, the PGM atom, labeled PGM, is striped, the oxygen atoms, one of which is labeled O, are speckled, the alkali metal atoms or alkaline earth metal atoms, one of which is labeled A/AE, are grey, and the hydrogen atoms, one of which is labeled H, are white.

The PGM atom or cluster or nanoparticle may be selected from the group consisting of platinum atom(s), palladium atom(s), rhodium atom(s), ruthenium atom(s), osmium atom(s), or iridium atom(s). The alkali metal may be selected from the group consisting of lithium, sodium, potassium, rubidium, cesium, and francium. The alkaline earth metal may be selected from the group consisting of beryllium, magnesium, calcium, strontium, barium, and radium.

In each of the PGM complexes 24, A, B, C, D, the alkali metal atoms or alkaline earth metal atoms of the stabilizing structure are bound to the PGM atom, or an atomic center of the PGM cluster, or an atomic center on the basal plane of the PGM nanoparticle through oxygen atoms (or oxygen linkages). In some examples, such as PGM complexes 24, A and 24, B, one oxygen atom links each of the alkali or alkaline earth metal atoms to the PGM atom or atomic center of the PGM cluster or PGM nanoparticle. In other examples, such as PGM complexes 24, C and 24, D, some of the alkali or alkaline earth metal atoms are linked to the PGM atom or atomic center of the PGM cluster or PGM nanoparticle via one oxygen atom, while other alkali or alkaline earth metal atoms have several atoms (e.g., two oxygen atoms and another alkali or alkaline earth metal atom) between itself and the PGM atom or atomic center of the PGM cluster or PGM nanoparticle.

In the PGM complexes 24, the mole ratio of the PGM species to the alkali or alkaline earth metal atoms ranges from 1:3 to 1:10. In an example, the mole ratio of the PGM species to the alkali or alkaline earth metal atoms ranges from 1:5 to 1:10. The number of oxygen and/or hydrogen atoms present in the PGM complexes 24 may vary in order to balance the zero charge of the complexes 24.

PGM complex 24, A includes nine oxygen atoms O, nine alkali or alkaline earth metal atoms A/AE, and two hydrogen atoms H. PGM complex 24, B includes eight oxygen atoms O, nine alkali or alkaline earth metal atoms A/AE, and two hydrogen atoms H. PGM complex 24, C includes ten oxygen atoms O, nine alkali or alkaline earth metal atoms A/AE, and seven hydrogen atoms H. PGM complex 24, D includes eleven oxygen atoms O, nine alkali or alkaline earth metal atoms A/AE, and nine hydrogen atoms H. While these complexes show the single PGM atom PGM, it is to be understood that this atom could be part of a cluster or nanoparticle.

While several examples of the PGM complexes 24, A, B, C, D are shown, it is to be understood that the stabilizing structure may include any number of alkali metal atoms or alkaline earth metal atoms, oxygen atoms, and hydrogen atoms.

Figure 3A:
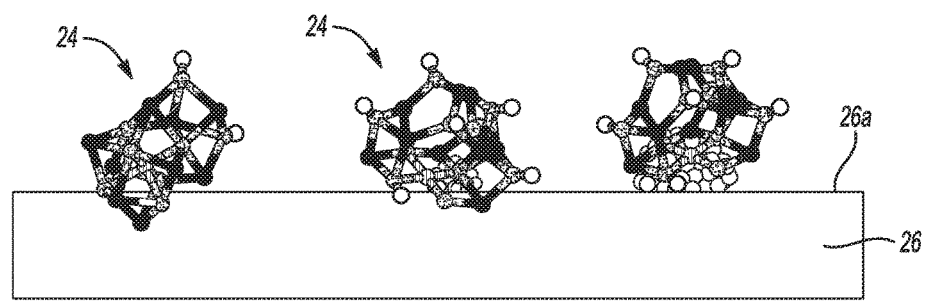
FIGS. 3A through 3D schematically depict an example of a method for making examples of the catalyst disclosed herein.
Figure 3B:
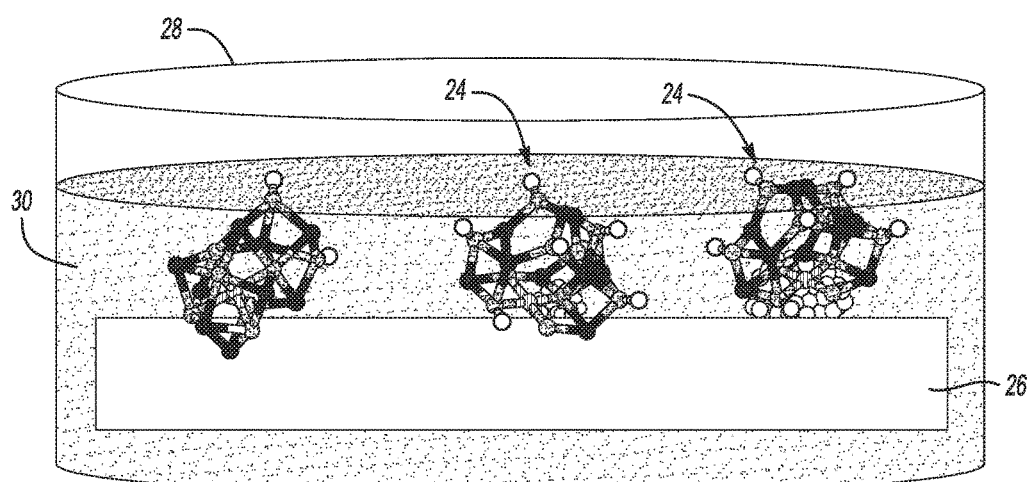
Figure 3C:
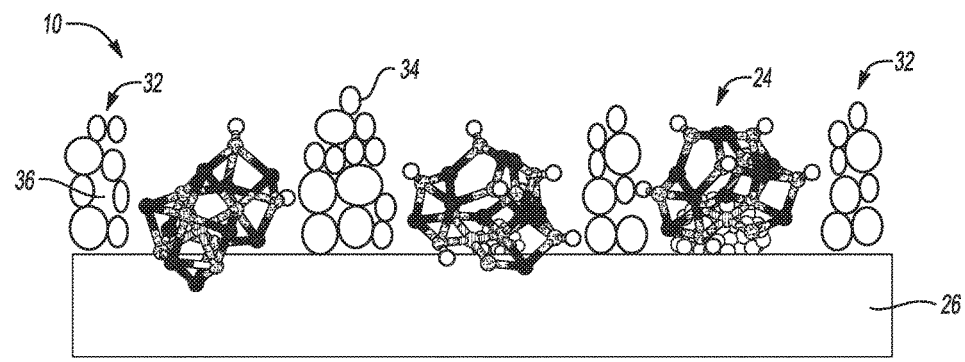
Figure 3D:
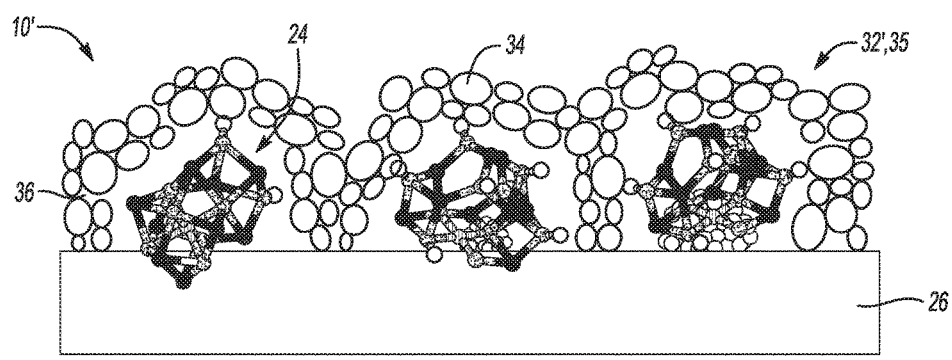

Referring now to FIGS. 3A through 3D, an example of a method for making several examples of the catalyst 10, 10' disclosed herein is depicted. One view of the catalyst 10 that is formed is shown in FIG. 3C, and another view of the catalyst 10' that is formed is shown in FIG. 3D.

Examples of the method generally include forming atomically dispersed PGM complexes 24 on a metal oxide support 26 (FIG. 3A), and selectively forming the barrier 32, 32' on the metal oxide support 26 at least around the PGM complexes 24 (FIG. 3B).

Referring now to FIG. 3A, the PGM complexes 24 are atomically dispersed on the metal oxide support structure 26.

The metal oxide support structure 26 is selected from the group consisting of $Al_2O_3$, $CeO_2$, $ZrO_2$, $CeO_2$—$ZrO_2$, $SiO_2$, $TiO_2$, ZnO, perovskite materials (e.g., $La_{0.9}FeO_3$, $LaFeO_3$, $LaAlO_3$, Sr-promoted $LaFeO_3$, Ce-promoted $LaFeO_3$, $LaMnO_3$, or $LaCoO_3$), zeolites, and combinations thereof. In the examples disclosed herein, the metal oxide support structure 26 is a non-modified metal oxide support, which does not have certain oxide domains mitigated by a trace amount of a heteroatom component).

The metal oxide support structure 26 may be in the form of a powder, spheres, or any other suitable configuration. The metal oxide support structure 26 may include several small pores. More pores increase the surface area to fit many PGM complexes 24, A, B, C, D in a small volume. In an example, the pore volume of the metal oxide support structure 26 ranges from about 0.5 ml/g to about 2 ml/g.

In the method(s) disclosed herein, before the PGM complexes 24 are loaded on the metal oxide support 26, it is to be understood that the metal oxide support 26 may be exposed to a process that reduces its surface area. Reducing the surface area of the support 26 prior to forming the catalyst 10, 10' means that there may be less of the surface 26 available for the PGM complexes 24 and for the barrier 32, 32'. Fewer PGM complexes 24 and barriers 32, 32' reduce the weight increase of the final catalyst 10, 10'.

In one example of the support 26 pretreatment, the metal oxide support 26 is calcined at a temperature ranging from about 350° C. to about 450° C. for a time ranging from about 9 hours to about 11 hours. In another example of the support 26 pretreatment, the metal oxide support 26 is heated in vacuum at a temperature ranging from about 60° C. to about 80° C. for a time ranging from about 10 hours to about 72 hours.

As shown in FIG. 3A, the PGM complexes 24 are atomically dispersed on the metal oxide support 26. By atomically dispersed, it is meant that the PGM complexes 24, A, B, C, D are spread over the metal oxide support structure 26 so that the PGM atoms, PGM clusters, and PGM nanoparticles of the PGM complexes 24, A, B, C, D are segregated, and that the atoms and clusters are generally not agglomerated together in particle form. The example shown in FIG. 3A illustrates one PGM complex 24 formed with a PGM atom (far left structure), one PGM complex 24 formed with a PGM cluster (middle structure), and one PGM complex formed with a PGM nanoparticles (right structure).

The PGM complexes 24, A, B, C, D may be bonded (physically and/or chemically) to the surface 26a of the metal oxide support structure 26, and may also be present within the pores (not shown) of the metal oxide support structure 26.

To form the PGM complexes 24, a PGM species precursor, an alkali metal precursor or an alkaline earth metal precursor, and a method are selected so that PGM-$O_x$-M linkages form (where M is the alkali or alkaline earth metal atom, and x=1-6). In some examples, x may range from 2 to 4. The alkali metal or the alkaline earth metal species should bridge easily to the PGM atom or the atomic center of one atom of the PGM cluster or the PGM nanoparticle during the catalyst preparation. In the examples disclosed herein, the alkali or alkaline earth ions do not modify the metal oxide support 26 at any characterization noticeable level, but rather, they bring the PGM species into the desired configuration with the stabilizing structure. Some of the PGM species may also bond to the metal oxide support structure 26 through an oxygen linkage (e.g., PGM-$O_x$—S, where S is the support structure 26 and x=1-6, or in some instances, x=2-4).

In one example of the method to form the PGM complexes 24, a platinum precursor and an alkali metal precursor are used. Examples of the platinum precursor include tetraammineplatinum (II) nitrate, tetraammineplatinum (II) chloride, tetraammineplatinum (II) hydroxide, chloroplatinic acid, platinum nitrate, platinum acetate, and dinitrodiamine platinum. Examples of the alkali metal precursor include potassium hydroxide, potassium nitrate, lithium hydroxide, lithium nitrate, sodium hydroxide, sodium nitrate, rubidium hydroxide, rubidium nitrate, cesium hydroxide, cesium nitrate, francium hydroxide, francium nitrate, and combinations thereof.

In this example method, the platinum precursor and the alkali metal precursor are co-impregnated on the metal oxide support 26. The co-impregnation method may be a dry (or incipient wetness) co-impregnation process or a wet co-impregnation process. Either of these co-impregnations utilizes a co-precursor solution. The co-precursor solution may be an aqueous solution containing water, the platinum precursor, and the alkali metal precursor. These particular precursors will not precipitate out of the solution.

The concentration of the precursor solution depends upon the desired loading of the PGM species and the alkali metal on the support 26 and in the catalyst 10, 10'. Generally, each example of the catalyst 10, 10' disclosed herein contains from greater than 0 wt % to about 5 wt % of the PGM species (i.e., PGM atoms and/or PGM clusters and/or PGM nanoparticles) based on the total weight of the catalyst 10, 10'. In an example, 10 g total of the catalyst 10 with 1.5% platinum and 7.5% alkali metal equates to 0.15 g platinum (i.e., 1.5% of 10 g) and 0.75 g alkali metal (i.e., 7.5% of 10 g). The mass ratio of pure platinum to platinum precursor may be used to determine how much of the platinum precursor should be used to achieve the desired mass of platinum for the catalyst 10, 10'. The mass ratio of pure alkali metal to alkali metal precursor may be used to determine how much of the alkali metal precursor should be used to achieve the desired mass of alkali metal for the catalyst 10, 10'. The total amount of water added to make the aqueous solution depends upon the type of co-impregnation. For dry impregnation, the total amount of water added to make the aqueous solution depends upon the volume of water that will fill the pore volume, i.e., achieve incipient wetness. For wet impregnation, the total amount of water added to make the aqueous solution depends upon the solubility of the precursors. The solution of this example may be added to 9.1 g of dried support 26 (i.e., 10 g total–0.15 g platinum–0.75 g alkali metal=g support).

For dry impregnation, the co-precursor solution is added to the support 26 until all of the pores of the support 26 are filled with the solution. No additional solution is added beyond the amount needed to fill the pores (i.e., incipient wetness). Capillary action draws the precursor solution into the pores.

For wet impregnation, the support 26 is first filled with the same solvent (e.g., water) that is used for the co-precursor solution. The wetted support 26 is then treated with the co-precursor solution. In this example, high pressure is not developed in the pores of the support 18, but rather the precursors migrate progressively from the co-precursor solution into the pores.

The co-impregnated support is then exposed to drying to remove the water and calcining to convert the platinum precursor to the platinum species (i.e., single atom or cluster) and the alkali metal precursor to the stabilizing structure (having the alkali metals bound to the platinum species via oxygen linkages). Drying may be performed in air at a temperature ranging from about room temperature (e.g., 18° C. to about 25° C.) to about 150° C. for a time period ranging from about 12 hours to about 24 hours, and calcining may be performed at a temperature ranging from about 300° C. to about 650° C. for a time period ranging from about 1 hour to about 4 hours. In an example, calcining is performed at about 550° C. for about 2 hours. This process decomposes the platinum and alkali metal precursors and forms the PGM complexes 24 both within the pores of the support 26 and on at least some of the surface of the support 26.

In another example of the method to form the PGM complexes 24, any PGM precursor and any alkali metal precursor or alkaline earth metal precursor are used. The PGM precursor may be selected from the group consisting of tetraammineplatinum (II) nitrate, tetraammineplatinum (II) chloride, tetraammineplatinum (II) hydroxide, chloroplatinic acid ($H_2PtCl_6$), platinum nitrate, platinum acetate, dinitrodiamine platinum, palladium nitrate, palladium acetate, bis-acetylacetonato palladium, rhodium nitrate, rhodium acetate, hexachloroiridic acid hexhydrate ($H_2IrCl_6.6H_2O$), ruthenium (III) chloride, ruthenium (III) acetylacetonate, ruthenium (II) hexa-ammine dichloride, ruthenium (III) hexa-ammine trichloride, osmium (III) chloride hydrate, ammonium hexachloroosmate (IV), iridium (IV) chloride, ammonium hexachloroiridate, iridium (III) chloride, iridium sulfate, and combinations thereof. The alkali metal precursor may be selected from the group consisting of potassium hydroxide, potassium nitrate, lithium hydroxide, lithium nitrate, sodium hydroxide, sodium nitrate, rubidium hydroxide, rubidium nitrate, cesium hydroxide, cesium nitrate, francium hydroxide, francium nitrate, and combinations thereof; or the alkaline earth metal precursor may be selected from the group consisting of barium hydroxide, barium nitrate, magnesium hydroxide, magnesium nitrate, beryllium hydroxide, beryllium nitrate, calcium hydroxide, calcium nitrate, strontium hydroxide, strontium nitrate, radium hydroxide, radium nitrate, and combinations thereof.

In this example of the method, sequential impregnation is utilized with drying in between each impregnation. Without drying, the impregnation of the second precursor could wash away the first precursor. Drying also takes place at a temperature that is below calcination temperatures of the precursors. If the precursors were calcined separately (i.e., immediately following their respective impregnations), the alkali or alkaline earth metals would be more likely to stay in their cationic form and not bind to the PGM species. In these instances, the PGM species and the alkali or alkaline earth metals will remain separate and not form the complexes disclosed herein.

This example of the method involves impregnating one of the precursors, either i) the PGM precursor or ii) the alkali metal precursor or alkaline earth metal precursor, on the metal oxide support 26 to form an impregnated metal oxide support.

This impregnation step may be a dry (or incipient wetness) impregnation process or a wet impregnation process. Either of these impregnations utilizes a PGM precursor solution (if the PGM precursor is to be loaded first) or an alkali metal precursor solution or an alkaline metal precursor solution (if the alkali metal precursor or alkaline earth metal precursor is to be loaded first).

The PGM precursor solution may be an aqueous solution containing water and the PGM precursor. The concentration of the PGM precursor solution depends upon the desired loading of the PGM species in the catalyst 10, 10'. For example, 10 g total of the catalyst 10 with 1.5% palladium equates to 0.15 g palladium (i.e., 1.5% of 10 g). The mass ratio of pure palladium to palladium precursor may be used to determine how much of the platinum precursor should be used to achieve the desired mass of palladium for the catalyst 10, 10'.

The alkali metal precursor solution may be an aqueous solution containing water and the alkali metal precursor. The alkaline earth metal precursor solution may be an aqueous solution containing water and the alkaline metal precursor. The concentration of the alkali metal precursor solution or alkaline earth metal precursor solution depends upon the desired loading of the alkali metal or the alkaline earth metal on the support 26 and in the catalyst 10, 10'. For example, 10 g total of the catalyst 10, 10' with 8.5% alkali metal or alkaline earth metal equates to 0.85 g alkali metal or alkaline earth metal (i.e., 8.5% of 10 g). The mass ratio of pure alkali metal to alkali metal precursor or pure alkaline earth metal to alkaline earth metal precursor may be used to determine how much, respectively, of the alkali metal precursor or the alkaline earth metal precursor should be used to achieve the desired mass of alkali metal for the catalyst 10, 10'.

The total amount of water added to make the PGM precursor solution or the alkali metal precursor solution or the alkaline metal precursor solution depends upon the type of impregnation. For dry impregnation, the total amount of water added to make the aqueous solution depends upon the volume of water that will fill the pore volume, i.e., achieve incipient wetness. For wet impregnation, the total amount of water added to make the aqueous solution depends upon the solubility of the respective precursors.

The PGM precursor solution or the alkali metal precursor solution or the alkaline earth metal precursor solution is added to the dried support 26 to perform dry impregnation or wet impregnation as previously described. This process forms an impregnated metal oxide support.

The impregnated metal oxide support is dried at a temperature below the calcination temperature of the PGM precursor or the alkali metal precursor or the alkaline earth metal precursor (whichever one precursor has been impregnated at this point). Examples of suitable drying temperatures (that are below the calcination temperature) range from about room temperature to about 120° C. In an example, the drying temperature is about 80° C.

This example of the method then involves impregnating the other of the precursors that has not yet been impregnated. For example, if the PGM precursor is already loaded on the support 26, then this impregnation will load the alkali metal precursor or the alkaline earth metal precursor. This impregnation will utilize the alkali metal precursor solution or the alkaline earth metal precursor solution as previously described. Alternatively, if the alkali metal precursor or the alkaline earth metal precursor is already loaded on the support 26, then this impregnation will load the PGM precursor. This impregnation will utilize the PGM precursor solution as previously described. This impregnation process results in a co-impregnated metal oxide support.

The co-impregnated metal oxide support is dried at a temperature below the calcination temperature of the PGM precursor and the alkali metal precursor or the alkaline earth metal precursor (because both precursors have been impregnated at this point).

The co-impregnated metal oxide support is then calcined. In this example, calcination takes place at a temperature ranging from about 350° C. to about 550° C. for a time ranging from about 2 hours to about 10 hours. This process decomposes both the PGM precursor and the alkali metal precursor or the alkaline earth metal precursor and forms the PGM complexes 24 both within the pores of the support 26 and on at least some of the surface of the support 26.

In still another example of the method, solid state impregnation is utilized to introduce the alkali metal or the alkaline earth metal precursors. This method avoids the use the alkali metal precursor solution and the alkaline earth metal precursor solution.

In the solid state impregnation method, any PGM precursor and any alkali metal precursor or alkaline earth metal precursor may be used. To reiterate, the PGM precursor may be selected from the group consisting of tetraammineplatinum (II) nitrate, tetraammineplatinum (II) chloride, tetraammineplatinum (II) hydroxide, chloroplatinic acid, platinum nitrate, platinum acetate, dinitrodiamine platinum, palladium nitrate, palladium acetate, bis-acetylacetonato palladium, rhodium nitrate, rhodium acetate, hexachloroiridic acid hexhydrate, ruthenium (III) chloride, ruthenium (III) acetylacetonate, ruthenium (II) hexa-ammine dichloride, ruthenium (III) hexa-ammine trichloride, osmium (III) chloride hydrate, ammonium hexachloroosmate (IV), iridium (IV) chloride, ammonium hexachloroiridate, iridium (III) chloride, iridium sulfate, and combinations thereof; the alkali metal precursor may be selected from the group consisting of potassium hydroxide, potassium nitrate, lithium hydroxide, lithium nitrate, sodium hydroxide, sodium nitrate, rubidium hydroxide, rubidium nitrate, cesium hydroxide, cesium nitrate, francium hydroxide, francium nitrate, and combinations thereof and the alkaline earth metal precursor may be selected from the group consisting of barium hydroxide, barium nitrate, magnesium hydroxide, magnesium nitrate, beryllium hydroxide, beryllium nitrate, calcium hydroxide, calcium nitrate, strontium hydroxide, strontium nitrate, radium hydroxide, radium nitrate, and combinations thereof.

In this example of the method, the PGM precursor is dispersed on and in the metal oxide support 26 by an impregnation method. This impregnation may be a dry (or incipient wetness) impregnation process or a wet impregnation process. Either of these impregnations utilizes the previously described PGM precursor solution.

After PGM precursor impregnation, the impregnated support is dried to remove the water and to form a powder. Drying may be accomplished in air at room temperature (e.g., ranging from about 18° C. to about 25° C.) for a time ranging from about 7 hours to about 12 hours.

The powder is then ground together with the alkali metal precursor or the alkaline earth metal precursor (which, in this example, is not in the form of a precursor solution). The amount of powder and precursor that are ground together may be based on the desired mole ratio of the PGM species to the alkali metal or the alkaline earth metal that is to be present in the catalyst 10. As mentioned herein, the ratio of PGM species to alkali or alkaline earth metal may range from 1:3 to 1:10. In some examples, this ratio ranges from 1:5 to 1:10.

Grinding of the power and the alkali metal precursor or the alkaline earth metal precursor may be a dry grinding process, which forms a powder mixture. During dry grinding, the temperature of the powder ranges from about 18° C. to about 80° C., or in some instances, to about 70° C. Dry grinding may take place for a time ranging from about 15 minutes to about 10 hours. Dry grinding may be accomplished by small-scale manual grinding, or with a grinding machine (e.g., mills, bead mills, attritors, etc.).

The powder mixture is then dried at a temperature ranging from about 18° C. to about 80° C. for a time ranging from about 8 hours to about 12 hours. The dried powder mixture is then calcined as previously described.

In the previously described examples (e.g., co-impregnation, sequential impregnation, and solid state impregnation), it is to be understood that calcination may be used to form the PGM complexes 24 and to burn off extra radicals (e.g., nitrate, acetate, ammonia, etc.) that may be bound to the PGM complex 24.

In yet another example of the method, the PGM complexes 24 are formed prior to being dispersed in and on the metal oxide support 26. This example method utilizes precursors and solvents that contain the PGM species, the alkali or alkaline earth metal, oxygen, and hydrogen alone, so that additional radicals are not present in the resulting PGM complex 24. In this example then, the PGM precursor is a PGM oxide (e.g., $PdO$, $PtO_2$, $RuO_2$, $RhO_2$ or $Rh_2O_3$, $OsO_2$, $IrO_2$) or a PGM hydroxide (e.g., $Pd(OH)_2$, $Pt(OH)_4$, $Ru(OH)_3$, $Rh(OH)_3$, $Os(OH)_4$, $Ir(OH)_3$), and the alkali metal precursor or alkaline earth metal precursor is an alkali metal hydroxide or an alkaline earth metal hydroxide). Examples of the alkali metal hydroxide precursor include: potassium hydroxide, lithium hydroxide, sodium hydroxide, rubidium hydroxide, cesium hydroxide, francium hydroxide, and combinations thereof and examples of the alkaline earth metal hydroxide precursor include: barium hydroxide, magnesium hydroxide, beryllium hydroxide, calcium hydroxide, strontium hydroxide, radium hydroxide, and combinations thereof.

To form the PGM complexes 24, an aqueous solution of the PGM oxide or the PGM hydroxide is first prepared. The concentration of the PGM oxide or the PGM hydroxide is based on the desired loading of the PGM species in the catalyst 10, and may be determined as previously described. This aqueous solution is heated up to a temperature of about 80° C., and the alkali metal hydroxide or the alkaline earth metal hydroxide is mixed into the aqueous solution at this temperature. The amount of alkali metal hydroxide or alkaline earth metal hydroxide that is added may be based on the desired mole ratio of the PGM species to the alkali metal or the alkaline earth metal that is to be present in the catalyst 10. As mentioned herein, the ratio of PGM species to alkali or alkaline earth metal may range from 1:3 to 1:10. In some examples, this ratio ranges from 1:5 to 1:10. After addition of the alkali metal hydroxide or the alkaline earth metal hydroxide, the aqueous solution may be refluxed at the same temperature for a time ranging from about 7 hours to about 12 hours. As a result of this process, the PGM complexes 24 form in the aqueous solution.

The following is one example of how the PGM complexes 24 may be formed via this example of the method. A designated amount of $PdO$ or $Pd(OH)_2$ is slurried in about 30 mL of water with $N_2$ sparging. This solution is heated up to 80° C. NaOH powder (molar ratio of Pd:Na=1:10) is added into the slurry at the same temperature. The mixture is refluxed at 80° C. overnight, and a transparent solution is formed. When lower concentrations of the alkali/alkaline earth metal, the transparent solution may be colorless, and at higher concentrations of the alkali/alkaline earth metal, the transparent solution may be light yellow. This solution does not precipitate at 80° C. with continued stirring.

The solution containing the PGM complexes 24 may then be used to impregnate the PGM complexes 24 on the metal oxide support 26. This impregnation process may be dry or wet impregnation, depending upon the total amount of water in the solution and the pore volume of the metal oxide support 26.

The impregnated support may then be dried. Drying may be accomplished in air at a temperature ranging from about room temperature (e.g., 18° C. to about 25° C.) to about 150° C. for a time period ranging from about 12 hours to about 24 hours.

In this example of the method, calcination may or may not be used, because the PGM complexes 24 are already formed and there are no extra radicals present that require removal. If performed, calcination may take place at a temperature ranging from about 300° C. to about 650° C. for a time period ranging from about 1 hour to about 4 hours. Performing calcination in this example of the method may be desirable when the catalyst 10, 10' is to be used in an application where the catalyst operation temperature is low (e.g., about 100° C.). At low operation temperatures, the catalyst 10, 10' may experience diffusion issues due to water molecules that may stick to the internal pores of the catalyst 10, 10'. Performing calcination prior to operational use can remove the water molecules, and thus reduce the potential for diffusion of the catalyst.

Once the PGM complexes 24 are formed and dispersed on the support 26, the barrier 32, 32' may then be formed at least on the exposed portions of the surface 26a of the support 26 at least around the PGM complexes 24. The barrier 32, 32' may have any shape and/or configuration that serves to slow shown or prevent the PGM species growth/sintering. As depicted in FIGS. 3C through 3D respectively, the barrier 32 may be formed of nanoparticles 34 that do not extend onto the PGM complexes 24 and the barrier 32' may be formed of nanoparticles 34 that form a porous coating 35 covering the PGM complexes 24. As will be discussed in more detail below, the barrier 32, 32' that is formed will depend, in part, upon the metal oxide support 26 that is used and/or the concentration of a metal oxide barrier precursor that is used.

Generally, the examples of the barrier 32, 32' may be formed via any suitable wet chemical process, including an impregnation process, a sol-gel method, a hydrothermal process, and a precipitation process.

The wet chemical process is schematically shown in FIG. 3B. In an example, the support 26 having the PGM complexes 24 therein/thereon is added to a suitable container 28. The support 26 having the PGM complexes 24 therein/thereon is then contacted with an aqueous metal oxide (barrier) precursor solution 30. The aqueous metal oxide precursor solution 30 and the support 26 having the PGM complexes 24 therein/thereon are mixed together to form a mixture.

The aqueous metal oxide precursor solution 30 includes water and a metal oxide barrier precursor dissolved in the water. Any number of metal salts can be used as the metal oxide barrier precursor, and will depend upon the metal oxide that is to be formed as the barrier 32, 32'. In some instances, it may be desirable for the support 26 and the barrier 32, 32' to be formed of the same metal oxide. As such, an aluminum salt may be used to form an $Al_2O_3$ barrier when the support 26 is $Al_2O_3$, a cerium salt may be used to form a $CeO_2$ barrier when the support 26 is $CeO_2$, a zirconium salt may be used to form a $ZrO_2$ barrier when the support 26 is $ZrO_2$, combinations of cerium and zirconium salts may be used to form a $CeO_2$—$ZrO_2$ barrier when the support 26 is $CeO_2$—$ZrO_2$, a silicon salt may be used to form a $SiO_2$ barrier when the support 26 is $SiO_2$, a titanium salt may be used to form a $TiO_2$ barrier when the support 26 is $TiO_2$, and a zinc salt may be used to form a ZnO barrier when the support is ZnO. Lanthanum salts, iron salts, aluminum salts, strontium salts, cerium salts, manganese salts, cobalt salts, and combinations thereof may be used to form barriers 32, 32' of perovskites. In other instances, for example, when the metal oxide support 26 is a zeolite, the barrier 32, 32' may be formed of a different metal oxide than the support 26. As examples, any of the salts previously described may be used to form a barrier 32, 32' of $Al_2O_3$, $CeO_2$, $ZrO_2$, $CeO_2$—$ZrO_2$, $SiO_2$, $TiO_2$, or ZnO on a zeolite support.

Some specific examples of suitable metal salts include salts of aluminum (Al), cerium (Ce), zirconium (Zr), titanium (Ti), silicon (Si), zinc (Zn), lanthanum (La), iron (Fe), strontium (Sr), manganese (Mn), cobalt (Co), or combinations thereof. As more specific examples, salts of Al include $AlCl_3$, $Al(NO_3)_3$, $Al(OH)_3$, $Al_2(SO_4)_3$, $Al(ClO_3)_3$, $AlO_4P$, and $Al(PO_3)_3$; salts of Ce include $Ce(NO_3)_3$, $Ce(OH_4)$, $Ce_2(SO_4)_3$, and $Ce(SO_4)_2$; salts of Zr include $Zr(HPO_4)_2$, $Zr(OH)_4$, and $Zr(SO_4)_2$; salts of Ti include $TiOSO_4$ and $TiOPO_4$; salts of Si include $SiPO_4(OH)$; salts of Zn include $Zn(NO_3)_2$, $Zn_3(PO_4)_2$, and $ZnSO_4$; salts of La include $La(NO_3)_3$, LaN, and $La(CH_3CO_2)_3$; salts of Fe include $Fe(NO_3)_3$, iron nitrides (e.g., $Fe_2N$, $Fe_4N$, $Fe_7N_3$, $Fe_{16}N_2$), and $Fe(CH_3CO_2)_2$; a salt of Sr includes $Sr(NO_3)_2$; salts of Mn include $MnCl_2$ and $Mn(NO_3)_2$; and salts of Co include $CoCl_2$, $Co(NO_3)_2$, and $Co(C_2H_3O_2)_2$; and any combinations of these salts may also be used. While several example salts have been provided, it is to be understood that other metal salts may be used as well.

The concentration of the metal oxide barrier precursor in the aqueous metal oxide precursor solution 30 depends, in part, upon the desired loading of the metal oxide barrier 32, 32' on the support 26 and in the catalyst 10, 10'. For example, 10 g total of the catalyst 10, 10' with 5 wt % metal oxide barrier 32, 32' equates to 0.5 g metal oxide (i.e., 5% of 10 g). The mass ratio of pure metal oxide to metal oxide precursor may be used to determine how much of the metal oxide precursor should be used to achieve the desired mass of metal oxide for the catalyst 10, 10'. The concentration of the metal oxide barrier precursor may also depend upon the loading of the PGM species (e.g., higher PGM loader may lead to higher loading of the metal oxide barrier precursor). The total amount of water added to the precursor solution 30 may depend upon the type of method used (e.g., dry impregnation) and/or the solubility of the metal oxide barrier precursor. As one example, the concentration of the metal oxide barrier precursor is selected so that the loading of the metal oxide barrier 32, 32', in the catalyst 10, 10' ranges from about 5 wt % to about 20 wt % of the catalyst 10, 10'. As will be discussed in more detail below, the concentration of the aqueous metal oxide precursor solution 30 may also affect the type of barrier 32, 32' that is ultimately formed.

When the mixture of the aqueous metal oxide precursor solution 30 and the support 26 having the PGM complexes 24 therein/thereon is formed, the interactions that take place within the solution 30 will depend, in part, upon the type of support 26 and/or the concentration of the metal oxide barrier precursor.

When the solution 30 includes metal oxide barrier precursor(s) that form inert metal oxides (e.g., $Al_2O_3$ or $SiO_2$) or perovskites, the metal oxide barrier precursor has a stronger tendency to interact with the support 26 than with the PGM complexes 24. In other words, there is significantly more chemical interaction between inert metal oxide barrier precursors and the support 26 than between the inert metal oxide barrier precursors and the PGM complexes 24 or there is significantly more chemical interaction between perovskite metal oxide barrier precursors and the support 26 than between the perovskite metal oxide barrier precursors and the PGM complexes 24. Thus the inert or perovskite metal oxide barrier precursors will migrate toward the support 26 and away from the PGM complexes 24. As a result of this migration, the inert or perovskite metal oxide barrier precursors will be present on the support 26 and not on the PGM complexes 24. This will ultimately form the barrier 32 as nanoparticles 34 (FIG. 3C) around, but not on, the PGM complexes 24. A higher precursor concentration generally leads to more nanoparticles 34.

When the solution 30 includes metal oxide barrier precursor(s) that form other, more reactive metal oxides, such as $CeO_2$, $ZrO_2$, $CeO_2$—$ZrO_2$, $TiO_2$, or ZnO, the metal oxide barrier precursor has a tendency to interact with both the support 26 and the PGM complexes 24. In other words, the more reactive metal oxide barrier precursors have strong chemical interaction with the support 26 and with the PGM complexes 24, and thus the reactive metal oxide barrier precursors will migrate toward both the support 26 and the PGM complexes 24. As a result of this migration, the more reactive metal oxide barrier precursors will be present on the support 26 and on the PGM complexes 24. This will ultimately form the barrier 32', which is a porous coating 35 of nanoparticles 34 (FIG. 3D) around and on the PGM complexes 24.

The mixture shown in FIG. 3B is then exposed to drying and calcining (not shown). Drying is accomplished to remove the water and to leave the solid metal oxide precursor on the support 26 around the PGM complexes 24 or on the support 26 and on the PGM complexes 24. Calcining is accomplished to decompose the solid metal oxide precursor, and thus to convert the metal oxide precursor to the metal oxide barrier 32 (FIG. 3C) or 32' (FIG. 3D). Drying may be passive, where the water is allowed to evaporate from the mixture. Drying may also be active, where the water is removed by exposure to an elevated drying temperature ranging from about 25° C. to about 150° C. for a drying time period ranging from about 2 minutes to about 72 hours. Drying may be performed in air or vacuum. Calcining may be performed at a calcining temperature ranging from about 300° C. to about 650° C. for a calcining time period ranging from about 20 minutes to about 10 hours. In various aspects, the temperature applied during calcining does not exceed the melting point of the metal oxide derived from the metal oxide barrier precursor (e.g., metal salt). As one example, drying may be performed in air for a time period ranging from about 2 hours to about 24 hours, and calcining may be performed at a temperature of about 550° C. for a time period of about 2 hours. While temperature and time ranges have been provided, it is to be understood that other temperatures and durations may be used to remove the water and to form the metal oxide barrier 32, 32'. In various aspects, the temperature applied during calcining does not exceed the melting point of the metal oxide derived from the metal salt.

As a result of the wet chemistry, drying, and calcining process, the catalyst 10 or 10' is formed.

In the example catalyst 10 shown in FIG. 3C, the barrier 32 is made up of the metal oxide nanoparticles 34 that do not form on the PGM complexes 24, but rather form on the exposed surface 26a of the support 26 (e.g., on those areas where the PGM complexes 24 are not present). As mentioned above, this barrier 32 may be formed when metal oxide barrier precursor(s) that form inert metal oxides or perovskites are used and when a lower concentration of the metal oxide barrier precursor(s) is used (which may result in smaller or less volume of nanoparticles 34). As illustrated in FIG. 3C, the metal oxide nanoparticles 34 form around the PGM complexes 24, and thus physically separate each PGM complex 24 from each other PGM complex 24. The metal oxide nanoparticles 34 essentially form a porous wall between the PGM complexes 24 on the surface 26a of the support 26, which functions to prevent the PGM species of each complex 24 from agglomerating through surface diffusion 22. The metal oxide nanoparticles 34 do not extend onto any of the PGM complexes 24, and thus the PGM species can be exposed directly to the exhaust gas during vehicle operation.

Pores 36 may be present between the metal oxide nanoparticles 34 (which are crystalline and may be porous). The porosity, i.e., a volume of pores 36 relative to the volume of nanoparticles 34, of the barrier 32' may range from about 20% to about 70%. The average size of the pores 36 between the nanoparticles 34 ranges from about 0.5 nm to about 30 nm.

The pores 36 formed between the metal oxide nanoparticles 34 and any pores formed in the metal oxide nanoparticles 34 provide gaps through which the exhaust gas can reach the PGM species of the PGM complexes 24. All of the pores 36 increase the surface area of the catalyst 10 by exposing more surfaces of metal oxide nanoparticles 34. The exposed surfaces can suppress vapor phase migration 12 by the condensation of PGM vapor thereon. Any mobile species from the PGM species that migrates via the vapor phase 12 may become deposited (e.g., as atoms) on the surfaces of the metal oxide nanoparticles 34. These PGM species remain catalytically active.

In the example catalyst 10' shown in FIG. 3D, the barrier 32' is made up of the porous coating 35, which includes metal oxide nanoparticles 34 and pores 36. The porous coating 35 forms on the PGM complexes 24 and on the exposed surface 26a of the support 26 (e.g., on those areas where the PGM complexes 24 are not present). As mentioned above, this barrier 32' may be formed when metal oxide barrier precursor(s) that form more reactive metal oxides are used. As illustrated in FIG. 3D, the porous coating 35 encapsulates each of the PGM complexes 24, and thus physically separates each PGM complex 24 from each other PGM complex 24.

The pores 36 in the porous coating 35 provide gaps through which the exhaust gas can reach the PGM species of the PGM complexes 24. The porosity, i.e., a volume of pores 36 relative to the volume of nanoparticles 34, of the barrier 32' may range from about 20% to about 70%. The average size of the pores 36 between the nanoparticles 34 ranges from about 0.5 nm to about 30 nm.

The porous coating 35 functions to prevent the PGM species of each complex 24 from agglomerating through surface diffusion 22. Moreover, exposed surfaces of the nanoparticles 34 of the coating 35 can suppress vapor phase migration 12 by the condensation of PGM vapor thereon. Any mobile species from the PGM species that migrates via the vapor phase 12 may become deposited (e.g., as atoms) on the surfaces of the metal oxide nanoparticles 34. These PGM species remain catalytically active.

In the barrier 32, the stack of nanoparticles 34 has a height that ranges from about 0.05X to about 10X, where X is a dimension of at least one of the PGM complexes 24. The dimension of at least one of the PGM complexes 24 is a diameter or width or height of a single complex 24. The height may be selected so that the stack of metal oxide nanoparticles 34 is tall enough to prevent or suppress migration, and short enough so that barrier 32 does not begin to cover the neighboring PGM complexes 24 and do not impede access of the exhaust gas to the PGM complexes 24. In an example, if the complex size ranges from about 3 nm to about 5 nm, the height of the stack of metal oxide nanoparticles 34 may range from about 0.15 nm (0.05×3) to about 50 nm (10×5). The height of the metal oxide nanoparticles 34 can be controlled by the concentration of the metal oxide nanoparticle precursor (e.g., metal salt), which in some examples ranges from about 5 wt % to about 20 wt %. A higher concentration generally leads to larger and/or a larger number of nanoparticles 34.

In the barriers 32 and 32', it is to be understood that the nanoparticles 34 have a maximum diameter ranging from about 0.5 nm to about 50 nm. As other examples, the maximum diameter of the metal oxide nanoparticles 34 may range from about 1 nm to about 25 nm, or from about 5 nm to 40 nm.

It is to be understood that the composition of the barrier 32, 32' will depend upon the metal oxide barrier precursor from which the nanoparticles 34 (and thus the barrier 32, 32') is/are derived. As examples, the barrier 32, 32' may be $Al_2O_3$, $CeO_2$, $ZrO_2$, $CeO_2$—$ZrO_2$, $SiO_2$, $TiO_2$, $ZnO$, $La_{0.9}FeO_3$, $LaFeO_3$, $LaAlO_3$, Sr-promoted $LaFeO_3$, Ce-promoted $LaFeO_3$, $LaMnO_3$, or $LaCoO_3$, or combinations thereof.

Figure 4A:
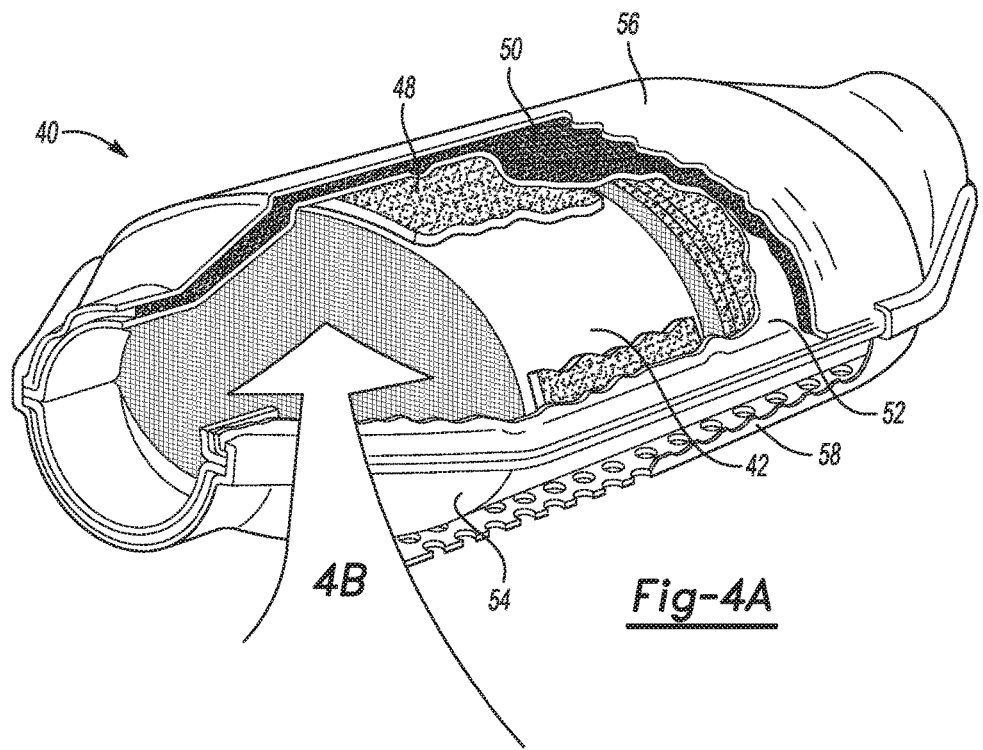
FIG. 4A is a perspective, partially cut-away view of an example of a catalytic converter.

The catalyst 10, 10' may be formed via the method(s) disclosed herein, and then may be applied to a monolith substrate and utilized in a catalytic converter. An example of the catalytic converter 40 is shown in FIG. 4A, and an example of the monolith substrate 42 is shown in both FIGS. 4A and 4B.

The catalytic converter 40 includes the monolith substrate 42. The monolith substrate 42 may be formed of a ceramic or a metal alloy that is capable of withstanding high temperatures (e.g., 100° C. or higher). Synthetic cordierite is a magnesium-alumino-silicate ceramic material that is suitable for use as the monolith substrate 42. A ferritic iron-chromium-aluminum alloy is an example of a metal alloy that is suitable for use as the monolith substrate 42. The monolith substrate 42 has a honeycomb or other three-dimensional structure.

Figure 4B:
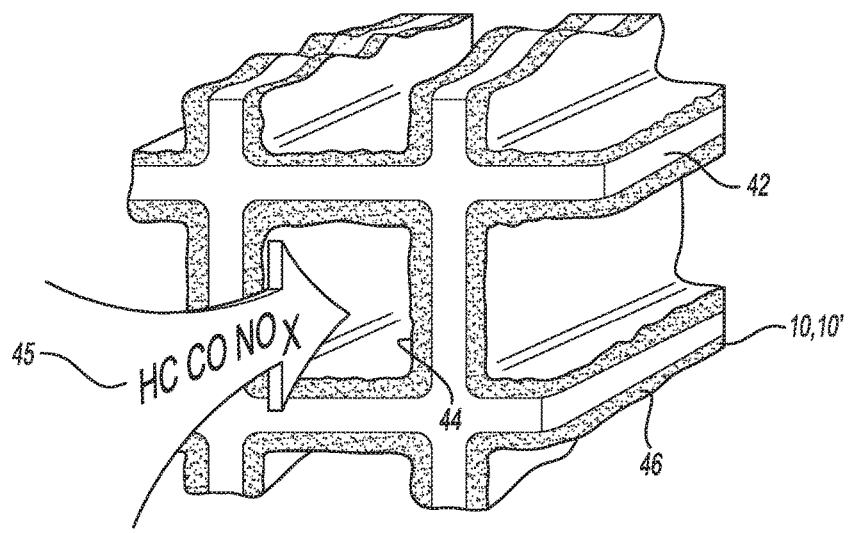
FIG. 4B is an enlarged view of a portion of FIG. 4A.

An enlarged view of a portion of the monolith substrate 42 is depicted in FIG. 4B. The monolith substrate 42 includes a large number of parallel flow channels 44 to allow for sufficient contact area between the exhaust gas 45 and the catalyst 10, 10' (contained in coating 46) without creating excess pressure losses.

The coating 46 includes the catalyst 10, 10' disclosed herein. In some instances, the coating 46 may also include a binder material (e.g., sol binders or the like). The coating 46 may be applied to the monolith substrate 42 by wash-coating or some other similar processes.

Referring back to FIG. 4A, in the catalytic converter 40, the monolith substrate 42 is surrounded by a mat 48, which in turn is surrounded by insulation 50. Upper and lower shells 52, 54 (formed of metal) may be positioned between the mat 48 and the insulation 50. An insulation cover 56 may be positioned over the upper shell 52 and the insulation 50 thereon, and a shield 58 may be positioned adjacent to the lower shell 54 and the insulation 50.

The catalytic converter 40 may be a DOC, which is used in a diesel engine. The DOC is a two way catalytic converter, which eliminates hydrocarbons and CO by oxidizing them, respectively, to water and $CO_2$. The DOC may also exhibit $NO_x$ storage capability during the vehicle cold-start period. In such diesel engines, the reduction of $NO_x$ to water and $N_2$ may take place in a separate unit, and may involve the injection of urea into the exhaust.

The catalytic converter 40 may also be a TWC, which is used in a stoichiometric spark-ignited engine. The TWC is a three way catalytic converter, which reduces NOx to $N_2$, and oxidizes HC and CO, respectively, to water and $CO_2$.

To further illustrate the present disclosure, an example is given herein. It is to be understood that this example is provided for illustrative purposes and is not to be construed as limiting the scope of the present disclosure.

EXAMPLE

This example was performed to test the effect of a palladium-containing complex and an aluminum oxide barrier on palladium dispersion, CO oxidation, and $C_3H_6$ oxidation in an aged catalyst.

Comparative Sample 1 included an alumina support with palladium metal loaded thereon during an impregnation process. The palladium of Comparative Sample 1 is non-stabilized (i.e., no stabilizing complex bonded thereto) and non-separated (i.e., no barrier was formed to separate the palladium species). During this process, an aqueous solution of palladium nitrate was added to alumina powder until all of the pores of the alumina powder were filled. The actual loading for Pd was 1.3 wt. %. Excess solution was not added. The impregnated powders were dried in air overnight, and then were calcined in air at 550° C. for 2 hours to form the decomposed palladium species on the alumina support.

Comparative Sample 2 included an alumina support with the palladium-containing complexes (with barium as the alkaline earth metal in the stabilizing structure) loaded thereon during a co-impregnation process. The palladium of Comparative Sample 2 is stabilized (i.e., a stabilizing complex is bonded thereto) and non-separated (i.e., no barrier was formed to separate the palladium complexes). During this process, an aqueous solution of palladium nitrate and barium nitrate (Pd:Ba=1:5 to 1:10 in mole) was added to alumina powder until all of the pores of the alumina powder were filled. The actual loading for Pd was 1.3 wt. %. Excess solution was not added. The co-impregnated powders were dried in air at room temperature overnight, and then were calcined in air at 350° C. to 550° C. for 2 to 4 hours to form the PGM complexes on the alumina support.

Comparative Sample 3 included the alumina support with the palladium species (1.3 wt %) loaded thereon (without the stabilizing structure, i.e., not as PGM complexes) and with a porous alumina coating/barrier formed around the Pd species. The palladium of Comparative Sample 3 is non-stabilized and separated (i.e., barrier was formed to separate the palladium species). For Comparative Sample 3, the alumina support with the palladium particles was exposed to OH reduction and a wet chemical process. The reduction and wet chemical process conditions were as follows: the alumina support with the palladium particles loaded thereon was reduced for 2 hours in a mixture of Argon gas and 3% $H_2$ at 400° C. (to remove reactive OH groups); the reduced sample was then exposed to an $Al(NO_3)_3$ solution to form a mixture; the mixture was dried at 80° C. for 10 hours (overnight) to remove water, and was then calcined at 500° C. for 2 hours to generate a porous alumina coating (composed of nanoparticles and pores) over the exposed surfaces of the alumina support. The porous alumina coating was not formed over the palladium species.

Sample 4 included an alumina support with the palladium-containing complexes (with barium as the alkaline earth metal in the stabilizing structure) loaded thereon during a co-impregnation process, and with a porous alumina coating/barrier formed around the Pd complexes. The palladium of Sample 4 is thus stabilized and separated. To form the Pd complexes, an aqueous solution of palladium nitrate and barium nitrate (Pd:Ba=1:5 to 1:10 in mole) was added to alumina powder until all of the pores of the alumina powder were filled. The actual loading for Pd was 1.2 wt. %. Excess solution was not added. The impregnated powders were dried in air at room temperature overnight, and then were calcined in air at 350° C. to 550° C. for 2 to 4 hours to form the Pd complexes on the alumina support. To form the alumina barrier, the alumina support having the Pd complexes thereon was then exposed to an $Al(NO_3)_3$ solution to form a mixture; the mixture was dried at 150° C. for 10 minutes to remove water, and was then calcined at 500° C. for 2 hours to generate a porous alumina coating (composed of nanoparticles and pores) over the exposed surfaces of the alumina support. The porous alumina coating was not formed over the palladium complexes.

Sample 5 was the same as Sample 4 and was prepared in the same manner as Sample 4, except that the actual loading for Pd was 0.6 wt. %. The palladium of Sample 5 is thus stabilized and separated.

Each of Comparative Samples 1, 2, and 3 and Samples 4 and 5 were exposed to an aging process. The aging process involved exposing the comparative samples and the samples to 950° C. for 2 hours in air with 10 vol. % water added.

The palladium dispersion (i.e., the ratio of the number of surface Pd atoms to the total number of Pd atoms) for Comparative Samples 1, 2, and 3 and Samples 4 and 5 after aging (i.e., "A" in FIG. 5) was determined by chemisorption.

Using chemisorption, the adsorption of a molecule (like CO or $H_2$) onto the PGM metal is measured. This measurement and the total mass of PGM in the sample enables the determination as to how much PGM is on the surface. Generally, the higher the dispersion, the higher the PGM utilization efficiency during catalyst operation.

Figure 5:
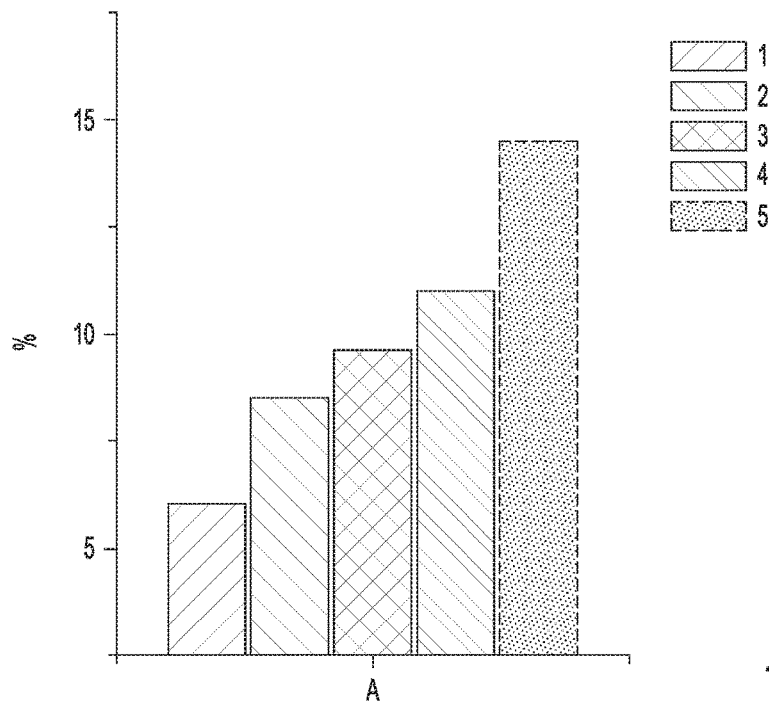
FIG. 5 is a graph depicting the palladium dispersion (i.e., the ratio of the number of surface metal atoms to the total number of metal atoms, shown as a percentage on the Y-axis) after aging (A) for a first comparative example (1), a second comparative example (2), a third comparative example (3), and two examples (4) and (5) including the PGM complexes and the barrier disclosed herein.

The palladium dispersion results are shown in FIG. 5. As depicted, Comparative Samples 1, 2, and 3 had respective palladium dispersions less than 10% after aging, while Samples 4 and 5 each had a palladium dispersion greater than 10% after aging. The aging results of Comparative Sample 1 are significantly reduced compared to the aging results of Samples 4 and 5. These results indicate that the non-stabilized and non-separated palladium of Comparative Sample 1 had undergone sintering and particle growth, while the stabilized and separated palladium Samples 4 and 5 reduced sintering and particle growth, even with 50% less of the palladium (comparing Sample 5 with Comparative Sample 1).

While the stabilized and non-separated palladium of Comparative Sample 2 and the non-stabilized and separated palladium of Comparative Sample 3 performed better than Comparative Sample 1, neither of these Samples performed as well as both stabilized and separated palladium (Samples 4 and 5).

Comparative Sample 1, 2, and 3 and Samples 4 and 5 were then exposed to exhaust gas (containing 5000 ppm CO, 500 ppm hydrocarbons (HC), 1.0% $O_2$, 5% $H_2O$, and $N_2$ balance) at an inlet temperature that was ramped up at a rate of 2° C. per minute (from 100° C. to 350° C.). The space velocity (SV) was 1,500,000 $cm^3$ $g_{catalyst}^{-1}$ $h^{-1}$, where space velocity refers to the quotient of the entering volumetric flow rate of the reactants divided by the reactor volume (or the catalyst bed volume) in a unit time. The conversion of CO and $C_3H_6$ were determined.

Figure 6A:
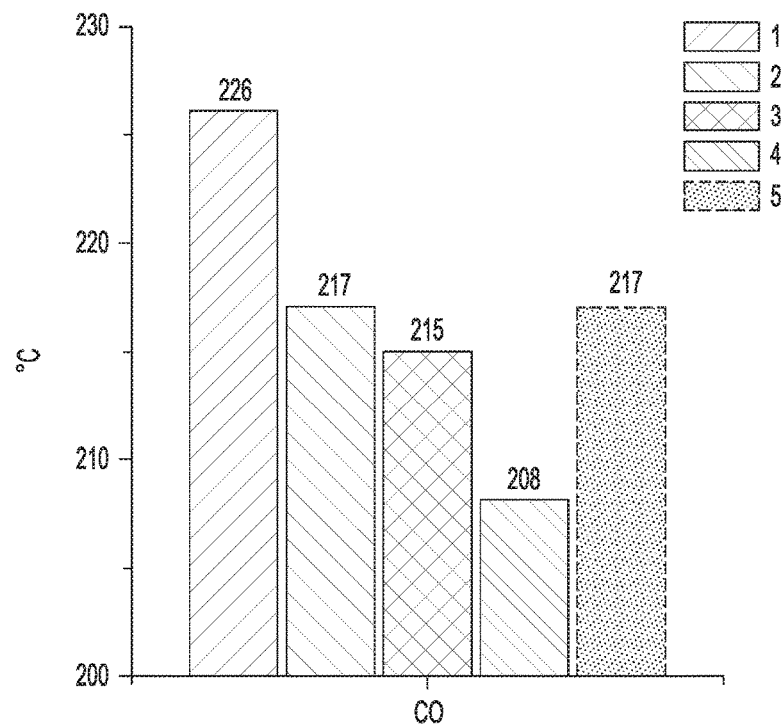
FIGS. 6A and 6B are graphs depicting the light-off temperature (in ° C.) respectively for carbon monoxide (CO) conversion and for $C_3H_6$ (propene or, alternatively, propylene) conversion for the three comparative examples (1, 2, 3) and the two examples (4, 5) including the PGM complexes and the barrier disclosed herein.
Figure 6B:
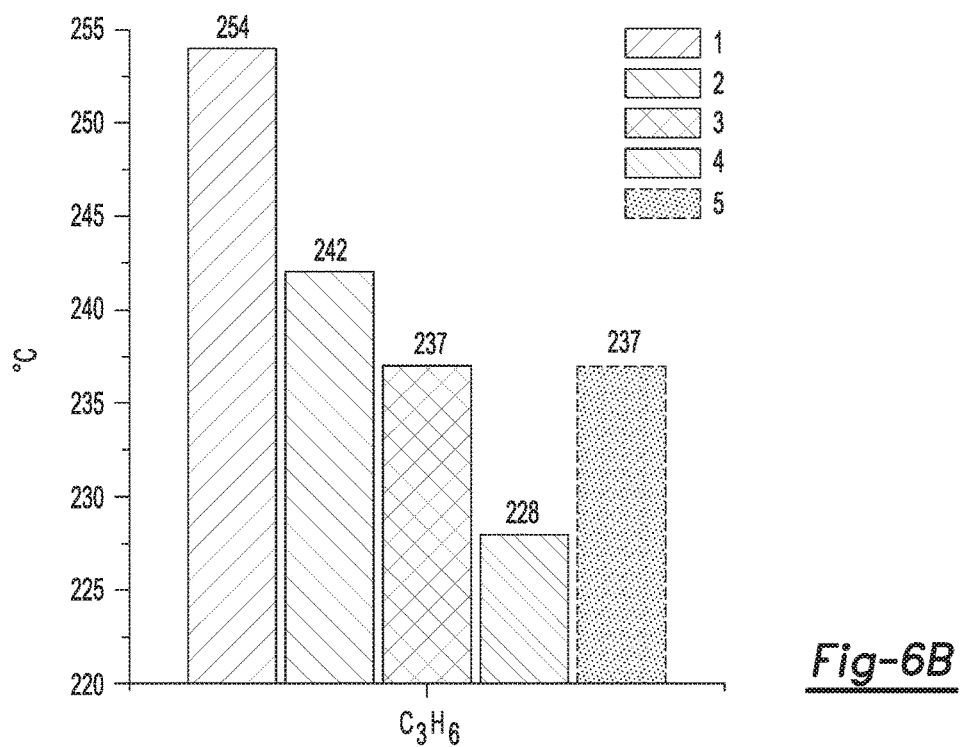

The light-off temperatures of the Comparative Samples 1, 2, and 3 and Samples 4 and 5 for CO and for $C_3H_6$ were determined. The light-off temperatures were measured at $T_{50}$, which is the temperature at which 50% conversion of CO or $C_3H_6$ was achieved. The lower $T_{50}$, the better. The CO light-off temperatures are shown in FIG. 6A and the $C_3H_6$ light-off temperatures are shown in FIG. 6B. Sample 4 performed better than each Comparative Sample for both CO and $C_3H_6$ oxidation, with slightly less palladium. These results also indicate that Sample 4 was more active than each of the Comparative Samples. Sample 5 performed better than Comparative Sample 1 and performed similarly to Comparative Samples 2 and 3 for CO oxidation, even with ~50% less platinum. Sample 5 also performed better than Comparative Samples 1 and 2 and performed the same as Comparative Sample 3 for $C_3H_6$ oxidation, even with ~50% less platinum. These results also indicate that Sample 5 was as active as or more active than the Comparative Samples with much less of the palladium.

It is to be understood that the ranges provided herein include the stated range and any value or sub-range within the stated range. For example, a range of from about 350° C. to about 450° C. should be interpreted to include not only the explicitly recited limits of from about 350° C. to about 450° C., but also to include individual values, such as 375° C., 420° C., 425.5° C. etc., and sub-ranges, such as from about 360° C. to about 415° C., etc. Furthermore, when "about" is utilized to describe a value, this is meant to encompass minor variations (up to +/−10%) from the stated value.

Reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

In describing and claiming the examples disclosed herein, the singular forms "a", "an", and "the" include plural referents unless the context clearly dictates otherwise.

While several examples have been described in detail, it is to be understood that the disclosed examples may be modified. Therefore, the foregoing description is to be considered non-limiting.

What is claimed is:

1. A catalytic converter, comprising:
   a catalyst including:
   a metal oxide support;
   platinum group metal (PGM) complexes atomically dispersed on the metal oxide support, the PGM complexes including:
   a PGM species being selected from the group consisting of an atom of a platinum group metal, a cluster including from 2 atoms to less than 10 atoms of the platinum group metal, a nanoparticle including 10 or more atoms of the platinum group metal, and combinations thereof; and
   a stabilizing structure bonded to the PGM species, the stabilizing structure comprising an alkali metal or an alkaline earth metal, an oxygen atom, and a hydrogen atom; and
   a barrier disposed between a first PGM complex and a second PGM complex.

2. The catalytic converter as defined in claim 1 wherein a mole ratio of the PGM species to the alkali metal or the alkaline earth metal ranges from 1:3 to 1:10.

3. The catalytic converter as defined in claim 1 wherein the metal oxide support is selected from the group consisting of $Al_2O_3$, $CeO_2$, $ZrO_2$, $CeO_2$—$ZrO_2$, $SiO_2$, $TiO_2$, ZnO, $La_{0.9}FeO_3$, $LaFeO_3$, $LaAlO_3$, Sr-promoted $LaFeO_3$, Ce-promoted $LaFeO_3$, $LaMnO_3$, or $LaCoO_3$, zeolites, and combinations thereof, and the barrier is selected from the group consisting of $Al_2O_3$, $CeO_2$, $ZrO_2$, $CeO_2$—$ZrO_2$, $SiO_2$, $TiO_2$, ZnO, $La_{0.9}FeO_3$, $LaFeO_3$, $LaAlO_3$, Sr-promoted $LaFeO_3$, Ce-promoted $LaFeO_3$, $LaMnO_3$, or $LaCoO_3$, and combinations thereof.

4. The catalytic converter as defined in claim 1 wherein:
   the alkali metal is selected from the group consisting of lithium, sodium, potassium, rubidium, cesium, and francium; or
   the alkaline earth metal is selected from the group consisting of beryllium, magnesium, calcium, strontium, barium, and radium.

5. The catalytic converter as defined in claim 1 wherein the PGM species is present in an amount ranging from greater than 0 wt % to about 5 wt % based on a total w % of the catalyst.

6. The catalytic converter as defined in claim 1 wherein the platinum group metal is selected from the group consisting of palladium, platinum, rhodium, ruthenium, osmium, iridium, and combinations thereof.

7. The catalytic converter as defined in claim 1 wherein the alkali metal or alkaline earth metal is bonded to the PGM species via an oxygen linkage.

8. The catalytic converter as defined in claim 1 wherein the barrier has a height ranging from about 0.05X to about 10X, wherein X is a dimension of at least one of the first and second PGM complexes.

9. The catalytic converter as defined in claim 1 wherein the metal oxide support is an inert oxide, and wherein the barrier is formed around, but not on, each of the first and second PGM complexes.

10. A method for forming a catalyst, the method comprising:
forming atomically dispersed platinum group metal (PGM) complexes on a metal oxide support, the PGM complexes including:
a PGM species being selected from the group consisting of an atom of a platinum group metal, a cluster including from 2 atoms to less than 10 atoms of the platinum group metal, a nanoparticle including 10 or more atoms of the platinum group metal, and combinations thereof; and
an alkali metal or an alkaline earth metal bonded to the PGM species, wherein the alkali metal or the alkaline earth metal is part of a stabilizing structure that comprises the alkali metal or the alkaline earth metal, an oxygen atom, including oxygen atoms and hydrogen atoms; and
selectively forming a barrier on the metal oxide support around the PGM complexes.

11. The method as defined in claim 10 wherein the metal oxide support is selected from the group consisting of $Al_2O_3$, $CeO_2$, $ZrO_2$, $CeO_2$—$ZrO_2$, $SiO_2$, $TiO_2$, ZnO, $La_{0.9}FeO_3$, $LaFeO_3$, $LaAlO_3$, Sr-promoted $LaFeO_3$, Ce-promoted $LaFeO_3$, $LaMnO_3$, or $LaCoO_3$, zeolites, and combinations thereof, and the barrier is selected from the group consisting of $Al_2O_3$, $CeO_2$, $ZrO_2$, $CeO_2$—$ZrO_2$, $SiO_2$, $TiO_2$, ZnO, $La_{0.9}FeO_3$, $LaFeO_3$, $LaAlO_3$, Sr-promoted $LaFeO_3$, Ce-promoted $LaFeO_3$, $LaMnO_3$, or $LaCoO_3$, and combinations thereof.

12. The method as defined in claim 10 wherein the selectively forming of the barrier is accomplished by an impregnation process, the impregnation process including:
contacting the metal oxide support, having the PGM complexes thereon, with an aqueous metal oxide precursor solution to form a mixture;
drying the mixture to remove water therefrom; and
calcining the mixture to generate the barrier.

13. The method as defined in claim 12 wherein the drying is performed at a drying temperature ranging from about 25° C. to about 150° C. for a drying time period ranging from about 2 minutes to about 72 hours, and the calcining of the mixture is performed at a calcining temperature ranging from about 300° C. to about 650° C. for a calcining time period ranging from about 20 minutes to about 10 hours.

14. The method as defined in claim 12 wherein the metal oxide support is an inert oxide, and wherein the barrier forms around, but not on, each of the first and second PGM complexes.

15. The method as defined in claim 10 wherein:
the PGM species is a platinum atom or a platinum cluster;
the PGM complex includes the alkali metal; and
the forming of the atomically dispersed platinum group metal (PGM) complexes on the metal oxide support is accomplished by:
co-impregnating a platinum precursor and an alkali metal precursor on the metal oxide support; and
calcining the co-impregnated metal oxide support.

16. The method as defined in claim 10 wherein the forming of the atomically dispersed platinum group metal (PGM) complexes on the metal oxide support is accomplished by:
impregnating one of i) a platinum group metal (PGM) precursor or ii) an alkali metal precursor or an alkaline earth metal precursor on the metal oxide support to form an impregnated metal oxide support;
drying the impregnated metal oxide support at a temperature below a calcination temperature;
impregnating the other of i) the platinum group metal precursor or ii) the alkali metal precursor or the alkaline earth metal precursor on the impregnated metal oxide support to form a co-impregnated metal oxide support;
drying the co-impregnated metal oxide support at a temperature below a calcination temperature; and
calcining the co-impregnated metal oxide support at a temperature ranging from about 350° C. to about 550° C. for a time ranging from about 2 hours to about 10 hours.

17. The method as defined in claim 10 wherein prior to forming the atomically dispersed PGM complexes on the metal oxide support, the method further comprises one of:
calcining the metal oxide support at a temperature ranging from about 350° C. to about 450° C. for a time ranging from about 9 hours to about 11 hours; or
heating the metal oxide support in vacuum at a temperature ranging from about 60° C. to about 80° C. for a time ranging from about 10 hours to about 72 hours.

18. The method as defined in claim 10 wherein the forming of the atomically dispersed platinum group metal (PGM) complexes on the metal oxide support is accomplished by:
dispersing a platinum group metal (PGM) precursor on the metal oxide support by incipient wet impregnation and drying to form a powder;
dry grinding an alkali metal precursor or an alkaline earth metal precursor with the powder at a temperature ranging from about 18° C. to about 80° C. for a time ranging from about 15 minutes to about 10 hours to form a powder mixture;
drying the powder mixture at a temperature ranging from about 18° C. to about 80° C. for a time ranging from about 8 hours to about 12 hours; and
calcining the powder mixture.

19. The method as defined in claim 10 wherein the forming of the atomically dispersed platinum group metal (PGM) complexes on the metal oxide support is accomplished by:
first forming the PGM complexes by:
preparing an aqueous solution of a PGM oxide or a PGM hydroxide;
heating the aqueous solution up to a temperature of about 80° C.; and
mixing an alkali metal hydroxide or an alkaline earth metal hydroxide into the aqueous solution at the temperature; and
then impregnating the PGM complexes on the metal oxide support.

20. The method as defined in claim 19, further comprising calcining the metal oxide support having the PGM complexes thereon.

* * * * *